US012603361B2

(12) United States Patent
Kim et al.

(10) Patent No.: US 12,603,361 B2
(45) Date of Patent: Apr. 14, 2026

(54) POUCH TYPE BATTERY CASE AND POUCH TYPE SECONDARY BATTERY

(71) Applicant: LG Energy Solution, Ltd., Seoul (KR)

(72) Inventors: Sang Hun Kim, Daejeon (KR); Soo Ji Hwang, Daejeon (KR); Min Hyeong Kang, Daejeon (KR); Hyung Kyun Yu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 744 days.

(21) Appl. No.: 17/802,318

(22) PCT Filed: Apr. 14, 2021

(86) PCT No.: PCT/KR2021/004686
§ 371 (c)(1),
(2) Date: Aug. 25, 2022

(87) PCT Pub. No.: WO2021/210908
PCT Pub. Date: Oct. 21, 2021

(65) Prior Publication Data
US 2023/0089546 A1 Mar. 23, 2023

(30) Foreign Application Priority Data
Apr. 14, 2020 (KR) ........................ 10-2020-0045542

(51) Int. Cl.
*H01M 50/119* (2021.01)
*H01M 50/105* (2021.01)
(Continued)

(52) U.S. Cl.
CPC ....... *H01M 50/105* (2021.01); *H01M 50/129* (2021.01); *H01M 50/133* (2021.01); *H01M 50/46* (2021.01)

(58) Field of Classification Search
CPC ............ H01M 50/105; H01M 50/129; H01M 50/133; H01M 50/46; H01M 50/119;
(Continued)

(56) References Cited

U.S. PATENT DOCUMENTS

2009/0317708 A1 12/2009 Brandl et al.
2010/0209768 A1* 8/2010 Ahn .................... H01M 50/133
429/185
(Continued)

FOREIGN PATENT DOCUMENTS

CN 101495305 A 7/2009
CN 104364401 A * 2/2015 ............. C22C 21/00
(Continued)

OTHER PUBLICATIONS

Search Report dated Oct. 30, 2022 from the Office Action for Chinese Application No. 202110400648.8 issued Nov. 3, 2022, pp. 1-3.
(Continued)

*Primary Examiner* — Christian Roldan
(74) *Attorney, Agent, or Firm* — Lerner David LLP

(57) ABSTRACT

The present invention relates to a pouch type battery case which includes a pouch film laminate including a sealant layer, a gas barrier layer, and a surface protection layer, wherein the sealant layer is formed of a first polymer as an innermost layer, the surface protection layer is formed of a second polymer as an outermost layer, and the gas barrier layer is laminated between the surface protection layer and the sealant layer and is formed of an aluminum alloy thin film having a thickness of 60 μm to 100 μm and a grain size of 10 μm to 13 μm.

16 Claims, 4 Drawing Sheets

(51) Int. Cl.

| | |
|---|---|
| *H01M 50/121* | (2021.01) |
| *H01M 50/124* | (2021.01) |
| *H01M 50/129* | (2021.01) |
| *H01M 50/133* | (2021.01) |
| *H01M 50/46* | (2021.01) |

(58) Field of Classification Search

CPC ... H01M 50/121; H01M 50/124; Y02E 60/10; B32B 15/08; B32B 15/085; B32B 15/088; B32B 15/20; B32B 2457/10; B32B 27/08; B32B 27/32; B32B 27/34

USPC ........................................................ 426/176

See application file for complete search history.

(56) References Cited

U.S. PATENT DOCUMENTS

| | | | |
|---|---|---|---|
| 2014/0356655 A1 | 12/2014 | Yoshino | |
| 2017/0194606 A1* | 7/2017 | Lim .................... | H01M 50/578 |
| 2017/0256758 A1† | 9/2017 | Kawakita | |
| 2017/0352844 A1* | 12/2017 | Yu ....................... | H01M 50/186 |
| 2018/0312943 A1* | 11/2018 | Amano ............... | H01M 50/126 |
| 2019/0148682 A1* | 5/2019 | Ojiri ....................... | C22C 21/00 |
| | | | 429/163 |
| 2020/0234912 A1 | 7/2020 | Liu | |
| 2020/0295315 A1 | 9/2020 | Kim et al. | |
| 2021/0083233 A1 | 3/2021 | Kim et al. | |
| 2023/0089546 A1 | 3/2023 | Kim et al. | |
| 2023/0170180 A1 | 6/2023 | Liu | |

FOREIGN PATENT DOCUMENTS

| | | | |
|---|---|---|---|
| CN | 205028959 U | 2/2016 | |
| CN | 105514304 A | 4/2016 | |
| CN | 107004785 A | 8/2017 | |
| CN | 107534103 A | 1/2018 | |
| CN | 108352463 A | 7/2018 | |
| CN | 110226254 A | 9/2019 | |
| JP | 2008093933 A | 4/2008 | |
| JP | 2011102423 A | 5/2011 | |
| JP | 2013174010 A | 9/2013 | |
| JP | 5424176 B2 | 2/2014 | |
| JP | 2016008706 A | 1/2016 | |
| JP | 6022956 B2 | 11/2016 | |
| JP | 2017084786 A | 5/2017 | |
| JP | 2017084787 A | 5/2017 | |
| JP | 2017157432 A | 9/2017 | |
| JP | 2019038183 A | 3/2019 | |
| JP | 6628009 B2 | 1/2020 | |
| JP | 2023518998 A | 5/2023 | |
| KR | 20050052069 A | 6/2005 | |
| KR | 20090079020 A | 7/2009 | |
| KR | 20110023438 A | 3/2011 | |
| KR | 20140141429 A | 12/2014 | |
| KR | 20170142624 A | 12/2017 | |
| KR | 102019360 B1 | 9/2019 | |
| KR | 20200025101 A | 3/2020 | |
| KR | 20200045542 A | 5/2020 | |
| WO | 2013168606 A1 | 11/2013 | |
| WO | 2017179712 A1 | 10/2017 | |
| WO | 2019124281 A1 † | 12/2019 | |
| WO | 2020045814 A1 | 3/2020 | |

OTHER PUBLICATIONS

International Search Report for PCT/KR2021/004686 dated Jul. 26, 2021. 3 pgs.

Chemical composition of wrought aluminium and aluminium alloys, GB/T3190-2020, Mar. 31, 2020, 46 Pages. [English translation of the related parts provided].

Search Report dated May 23, 2024 from the Office Action for Chinese Application No. 202180018391.8 issued May 25, 2024, 2 pages. [See p. 1, categorizing the cited references].

Extended European Search Report for Application No. 21789172.0 datd Jun. 26, 2023. 7 pgs.

Sakaguchi, A Study on Aluminum Foil/Resin Film Laminating Material for Overhanging Molding, The University of Osaka Institutional Knowledge Archive : OUKA, (1989), retrieved from <<http://hdl.handle.net/11094-36510>>. 5 pgs.

JIS H4160-1994, Aluminum and Aluminum alloy foil, (2006), retrieved from <<http://kikakurui.com/h4/H4160-2006-01.html>>. 14 pgs.

\* cited by examiner

† cited by third party

[FIG.1]
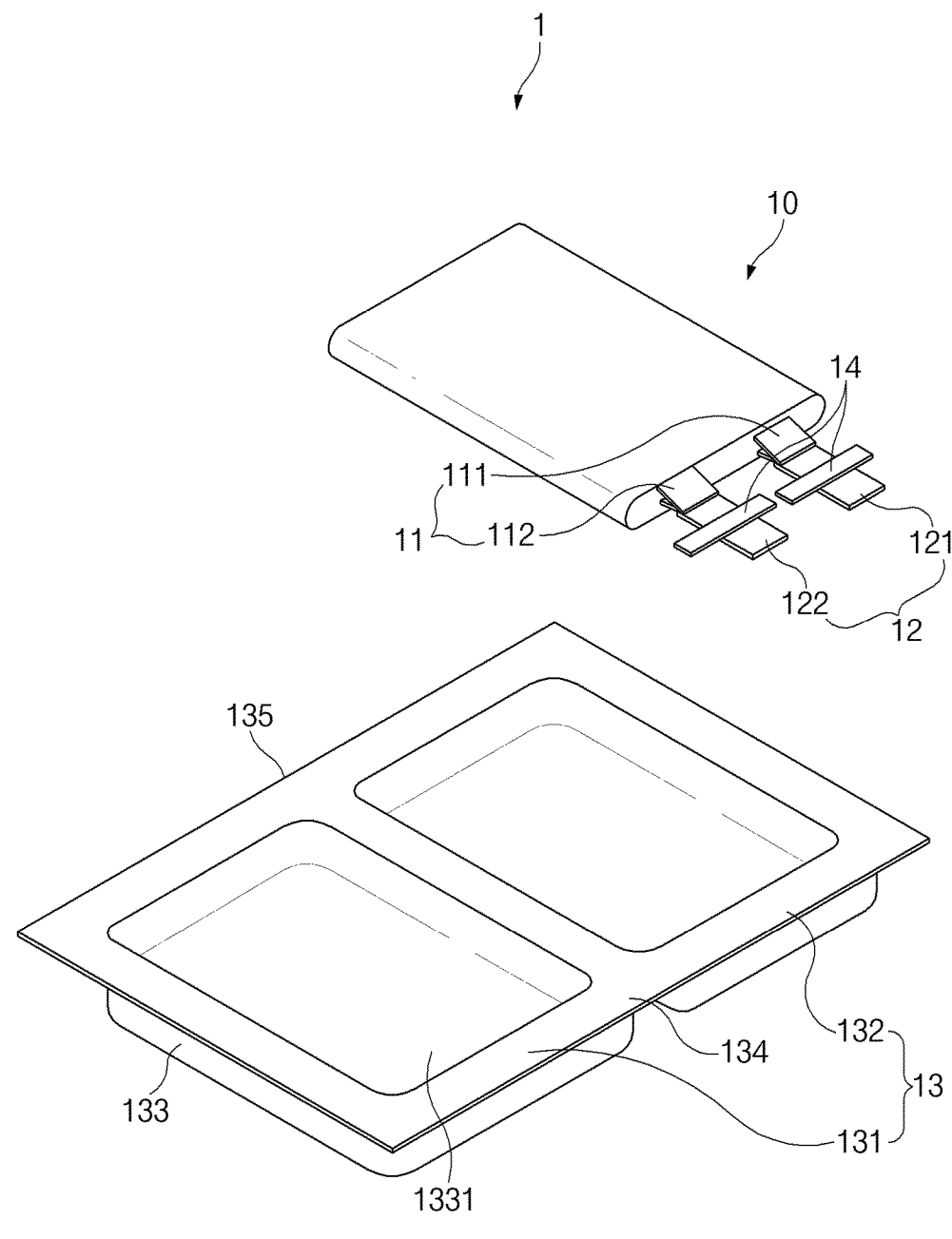

[FIG.2]
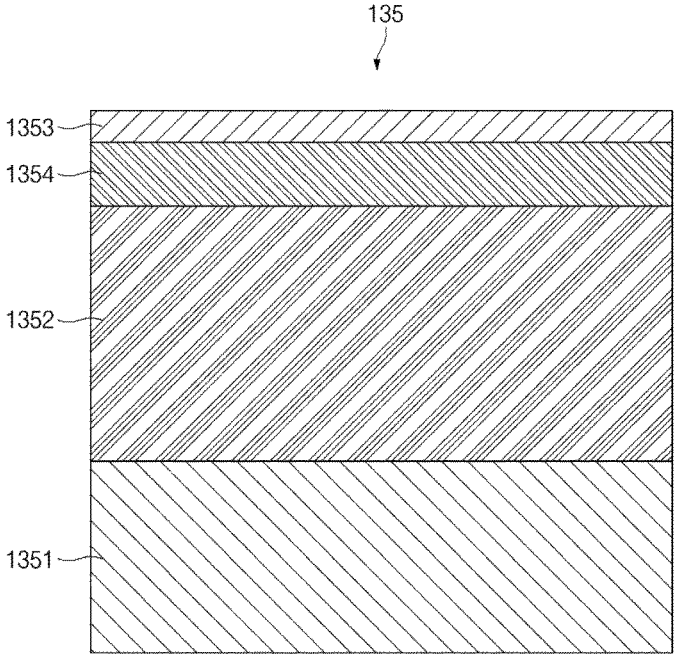
[FIG.3]
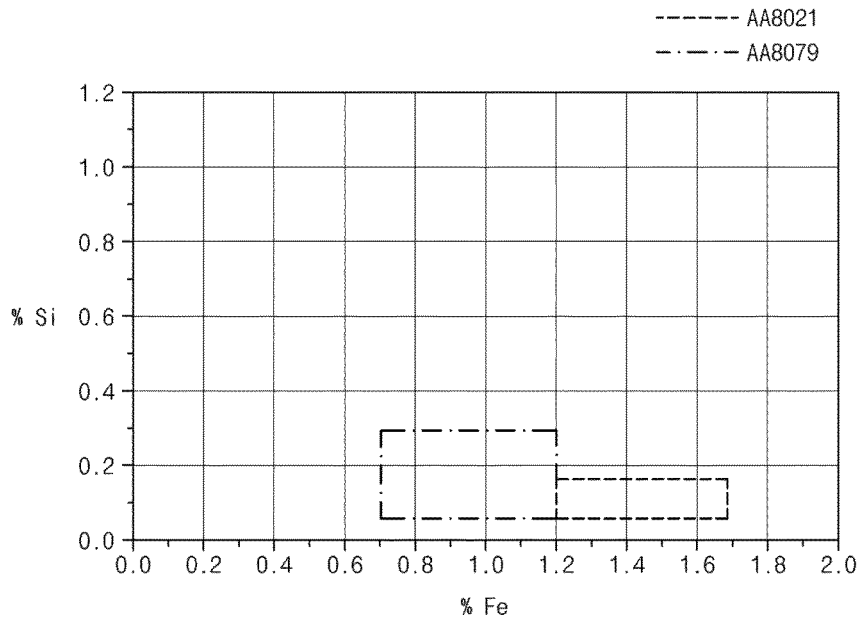

[FIG.4]
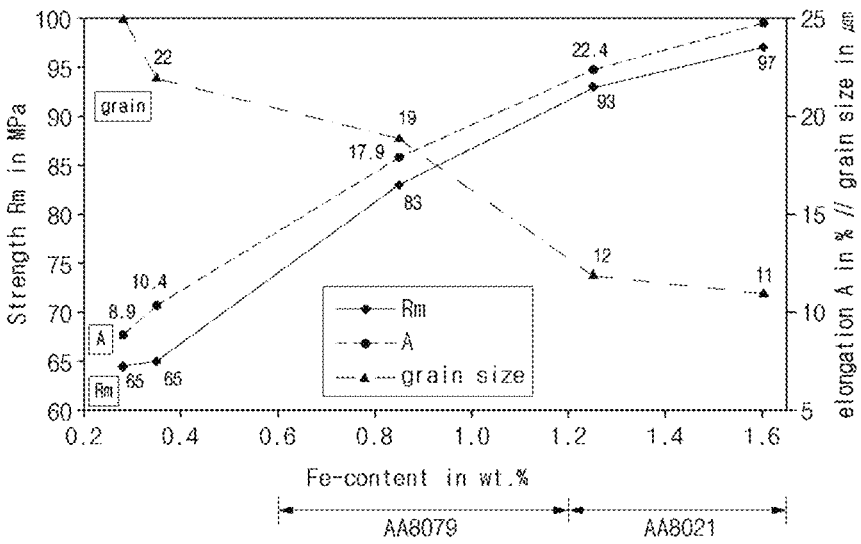
[FIG.5]
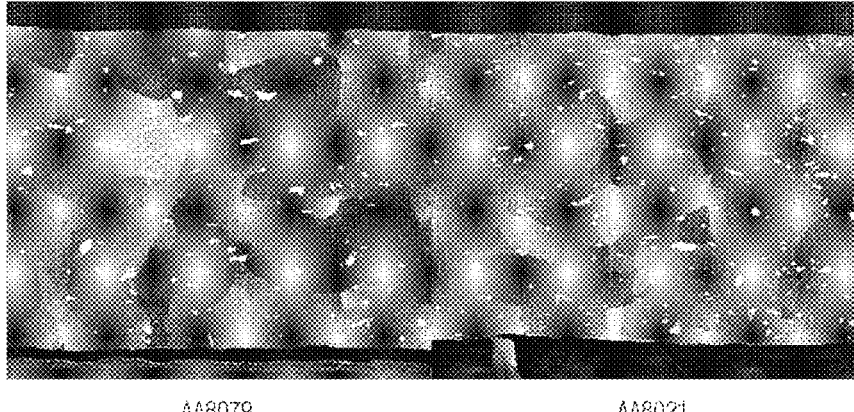
AA8079                                        AA8021

[FIG.6]
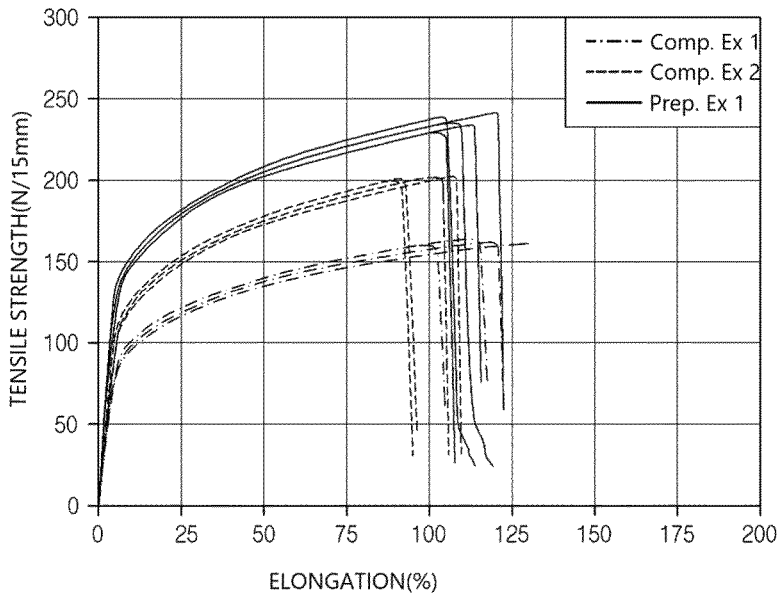
[FIG.7]
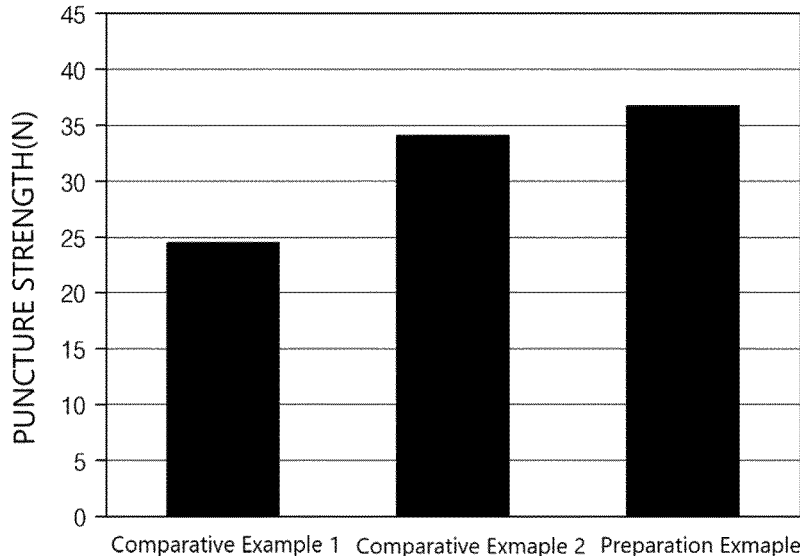

POUCH TYPE BATTERY CASE AND POUCH TYPE SECONDARY BATTERY

CROSS-REFERENCE TO RELATED APPLICATIONS

This application is a national phase entry under 35 U.S.C. § 371 of International Application No. PCT/KR2021/004686, filed on Apr. 14, 2021, which claims priority to Korean Patent Application No. 10-2020-0045542, filed on Apr. 14, 2020, the disclosures of which are incorporated by reference herein.

TECHNICAL FIELD

The present invention relates to a pouch type battery case and a pouch type secondary battery, and more particularly, to a pouch type battery case, in which formability is improved by improving tensile strength and elongation, and a pouch type secondary battery.

BACKGROUND ART

In general, types of secondary batteries include a nickel cadmium battery, a nickel hydride battery, a lithium ion battery, and a lithium ion polymer battery. These secondary batteries are not only applied and used in small products such as digital cameras, P-DVDs, MP3Ps, mobile phones, PDAs, portable game devices, power tools, and E-bikes, but are also applied and used in large products requiring high output, such as electric vehicles and hybrid vehicles, and a power storage device and a power storage device for backup which store surplus generated power or renewable energy.

In order to prepare such a secondary battery, first, a positive electrode collector and a negative electrode collector are respectively coated with electrode active material slurries to prepare a positive electrode and a negative electrode, and the positive electrode and the negative electrode are then stacked on both sides of a separator to form an electrode assembly having a predetermined shape. Then, after the electrode assembly is accommodated in a battery case and an electrolyte solution is injected, the battery case is sealed.

The secondary battery is classified into a pouch type, a can type, and the like, according to a material of a case for accommodating the electrode assembly. The pouch type accommodates the electrode assembly in a pouch formed of a flexible polymer material. In addition, the can type accommodates the electrode assembly in a case formed of a material such as metal or plastic.

The pouch, which is a case of the pouch type secondary battery, is prepared by press working of a flexible pouch film laminate to form a cup portion. Then, when the cup portion is formed, the electrode assembly is accommodated in an accommodating space of the cup portion and a sealing portion is sealed to prepare a secondary battery.

Drawing in the press working is performed by inserting the pouch film laminate into press equipment and applying a pressure to the pouch film laminate with a punch to stretch the pouch film laminate. The pouch film laminate is composed of a plurality of layers, and a gas barrier layer disposed therein is formed of metal. However, a conventional pouch film laminate had a limitation in forming a deeper cup portion, and also had a limitation in reducing a radius of filleting when edges of a bottom portion and edges of an open portion of the cup portion are filleted. Furthermore, the conventional pouch film laminate had a limitation in forming an outer wall of the cup portion close to vertical. Accordingly, there was a problem in that a dead space of the secondary battery was increased and a size of the electrode assembly was decreased to reduce energy efficiency to volume.

DISCLOSURE OF THE INVENTION

Technical Problem

An aspect of the present invention provides a pouch type battery case, in which formability is improved by improving tensile strength and elongation, and a pouch type secondary battery.

The object of the present invention is not limited to the aforesaid, but other objects not described herein will be clearly understood by those skilled in the art from descriptions below.

Technical Solution

According to an aspect of the present invention, there is provided a pouch type battery case accommodating an electrode assembly therein which is formed by stacking a positive electrode, a separator, and a negative electrode, wherein the pouch type battery case includes a pouch film laminate including: a sealant layer formed of a first polymer that is an innermost layer; a surface protection layer formed of a second polymer that is an outermost layer; and a gas barrier layer laminated between the surface protection layer and the sealant layer and formed of an aluminum alloy film having a thickness of 60 µm to 100 µm and a grain size of 10 µm to 13 µm. Also, the aluminum alloy film may include iron in an amount of 1.2 wt % to 1.7 wt %.

Furthermore, the aluminum alloy film may include iron in an amount of 1.3 wt % to 1.7 wt %.

Also, the aluminum alloy film may include silicon in an amount of 0.2 wt % or less.

Furthermore, the aluminum alloy film may have a grain size of 10.5 µm to 12.5 µm.

Also, the aluminum alloy film may have alloy number AA8021.

Furthermore, the gas barrier layer may have a thickness of 70 µm to 90 µm.

Also, a thickness of the sealant layer may be 0.6 times to 1.2 times the thickness of the gas barrier layer, for example, may be in a range of 30 µm to 90 µm.

Furthermore, the first polymer may include polypropylene (PP).

Also, the surface protection layer may have a thickness of 6 µm to 25 µm.

Furthermore, the second polymer may include polyethylene terephthalate (PET).

Also, the pouch type battery case may further include a drawing assistance layer which is formed of a third polymer and is laminated between the surface protection layer and the gas barrier layer.

Furthermore, the drawing assistance layer may have a thickness of 20 µm to 50 µm.

Also, the third polymer may include Nylon.

Furthermore, the pouch film laminate may have a total thickness of 180 µm or more, for example, 180 µm to 210 µm.

Also, the pouch film laminate may have a tensile strength, which is measured while the pouch film laminate is pulled at a tensile speed of 50 mm/min after being cut to a size of 15 mm×80 mm, of 200 N/15 mm to 300 N/15 mm, and may have an elongation of 105% to 150%.

According to another aspect of the present invention, there is provided a pouch type secondary battery including an electrode assembly therein which is formed by stacking a positive electrode, a separator, and a negative electrode; and a pouch type battery case accommodating the electrode assembly, wherein the battery case includes: a sealant layer formed of a first polymer that is an innermost layer; a surface protection layer formed of a second polymer that is an outermost layer; and a gas barrier layer laminated between the surface protection layer and the sealant layer and formed of an aluminum alloy film having a thickness of 60 μm to 100 μm and a grain size of 10 μm to 13 μm.

Other specific details of the present invention are included in the detailed description and drawings.

Advantageous Effects

According to the embodiments of the present invention, at least the following effects may be achieved.

A pouch type battery case according to the present invention improves tensile strength, elongation, and toughness of a pouch film laminate by using the pouch film laminate including an aluminum alloy film having specific thickness and grain size as a gas barrier layer. If the pouch film laminate is used, since a forming depth may be increased without occurrence of pinholes or cracks during forming of a cup portion and a radius of curvature of an edge of the cup portion may be reduced, an accommodating space volume of a battery assembly may be increased.

Also, since the pouch film laminate according to the present invention has excellent puncture strength, it may more effectively protect an internal electrode assembly even if it is under great pressure from the outside or is damaged by being pierced by a sharp object.

The effects according to the present invention are not limited to the contents as exemplified above, but more various effects are included in the specification.

BRIEF DESCRIPTION OF THE DRAWINGS

FIG. 1 is an assembly view of a secondary battery according to an embodiment of the present invention;

FIG. 2 is a cross-sectional view of a pouch film laminate according to an embodiment of the present invention;

FIG. 3 is a graph illustrating iron and silicon contents of an aluminum alloy with alloy number AA8079 and an aluminum alloy with alloy number AA8021;

FIG. 4 is a graph illustrating tensile strength, elongation, and grain size of the aluminum alloy with alloy number AA8079 and the aluminum alloy with alloy number AA8021;

FIG. 5 is magnified scanning electron microscope (SEM) images of grains of a thin film of the aluminum alloy with alloy number AA8021 used in Example 1 and a thin film of the aluminum alloy with alloy number AA8079 used in Comparative Example 3;

FIG. 6 is a graph of the results of testing tensile strength and elongation of pouch film laminates according to Preparation Example, Comparative Example 1, and Comparative Example 2 of the present invention; and FIG. 7 is a graph of the results of testing puncture strength of the pouch film laminates according to Preparation Example, Comparative Example 1, and Comparative Example 2 of the present invention.

MODE FOR CARRYING OUT THE INVENTION

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless defined otherwise, all terms (including technical and scientific terms) used herein may be intended to have meanings understood by those skilled in the art. In addition, terms defined in general dictionaries should not be interpreted abnormally or exaggeratedly, unless clearly specifically defined.

The terminology used herein is for the purpose of describing particular example embodiments only and is not intended to be limiting of the present invention. In the specification, the terms of a singular form may include plural forms unless referred to the contrary. It will be further understood that the terms "comprises" and/or "comprising" when used in this specification, specify the presence of stated components, but do not preclude the presence or addition of one or more other components.

Hereinafter, preferred embodiments of the present invention will be described in detail with reference to the accompanying drawings.

FIG. 1 is an assembly view of a secondary battery 1 according to an embodiment of the present invention.

According to an embodiment of the present invention, since toughness is increased by improving tensile strength and elongation of a pouch film laminate 135, formability may be improved when the pouch film laminate 135 is formed to prepare a pouch type battery case 13. Also, since the pouch film laminate has excellent puncture strength, it may more effectively protect an internal electrode assembly even if it is under great pressure from the outside or is damaged by being pierced by a sharp object.

For this purpose, the pouch type battery case 13 according to an embodiment of the present invention is the pouch type battery case 13 accommodating an electrode assembly 10 which is formed by stacking a positive electrode, a separator, and a negative electrode, and includes the pouch film laminate 135 including a sealant layer 1351 formed of a first polymer as an innermost layer; a surface protection layer 1353 formed of a second polymer as an outermost layer; and a gas barrier layer 1352 laminated between the surface protection layer 1353 and the sealant layer 1351 and formed of an aluminum alloy film having a thickness of 60 μm to 100 μm and a grain size of 10 μm to 13 μm.

The secondary battery 1 according to the embodiment of the present invention includes the electrode assembly 10 which is formed by stacking a positive electrode, a separator, and a negative electrode; and the pouch type battery case 13 accommodating the electrode assembly 10, wherein the battery case 13 includes the pouch film laminate 135 including: the sealant layer 1351 formed of a first polymer as an innermost layer; the surface protection layer 1353 formed of a second polymer as an outermost layer; and the gas barrier layer 1352 laminated between the surface protection layer 1353 and the sealant layer 1351 and formed of an aluminum alloy film having a thickness of 60 μm to 100 μm and a grain size of 10 μm to 13 μm.

The electrode assembly 10 is formed by sequentially stacking a positive electrode, a separator, and a negative electrode. First, a slurry, in which an electrode active material, a binder, and a conductive material are mixed, is applied to a positive electrode collector and a negative electrode collector to prepare the positive electrode and the negative electrode, and, after the electrode assembly 10 having a predetermined shape is formed by stacking the positive electrode and the negative electrode on both sides of the separator, the electrode assembly 10 is inserted into the battery case 13, and the battery case 13 is sealed after injecting an electrolyte solution.

Specifically, the electrode assembly 10 includes two types of electrodes, such as the positive electrode and the negative electrode, and the separator disposed between the electrodes to insulate the electrodes from each other. The electrode assembly 10 includes a stacked type, a jelly-roll-type, and a stack and folding type. The two types of electrodes, that is, the positive electrode and the negative electrode, have a structure in which active material slurries are applied to electrode collectors in the form of a metal foil or metal mesh including aluminum and copper, respectively. The active material slurry may be typically formed by stirring a granular active material, a conductive material, and a binder in a state in which a solvent is added. The solvent is removed in a subsequent process.

As illustrated in FIG. 1, the electrode assembly 10 includes an electrode tab 11. The electrode tab 11 is connected to each of the positive electrode and the negative electrode of the electrode assembly 10 and protrudes from one side of the electrode assembly 10 to the outside so that it becomes a path through which electrons may move between the inside and the outside of the electrode assembly 10. The current collector of the electrode assembly 10 is composed of a portion to which the electrode active material is applied and an end portion to which the electrode active material is not applied, that is, an uncoated portion. The electrode tab 11 may be formed by cutting the uncoated portion or may be formed by connecting a separate conductive member to the uncoated portion by ultrasonic welding or the like. As illustrated in FIG. 1, the electrode tabs 11 may protrude side by side from one side of the electrode assembly 10 in the same direction, but are not limited thereto and may protrude in different directions, respectively.

An electrode lead 12 is connected to the electrode tab 11 of the electrode assembly 10 by spot welding or the like. In addition, a portion of the electrode lead 12 is surrounded by an insulating portion 14. The insulating portion 14 is limitedly located at a sealing portion 134, to which a first case 131 and a second case 132 of the battery case 13 are thermally fused, to adhere the electrode lead 12 to the battery case 13. In addition, the insulating portion 14 prevents flow of electricity generated from the electrode assembly 10 to the battery case 13 through the electrode lead 12, and maintains sealing of the battery case 13. Thus, the insulating portion 14 is formed of an insulator having non-conductivity which does not conduct electricity well. In general, as the insulating portion 14, an insulating tape, which is easy to be attached to the electrode lead 12 and is relatively thin, is widely used, but the present invention is not limited thereto and various members may be used as long as they may insulate the electrode lead 12.

One end of the electrode lead 12 is connected to the electrode tab 11, and the other end thereof protrudes to the outside of the battery case 13. That is, the electrode lead 12 includes a positive electrode lead 121, which has one end connected to a positive electrode tab 111 and extends in a protruding direction of the positive electrode tab 111, and a negative electrode lead 122 which has one end connected to a negative electrode tab 112 and extends in a protruding direction of the negative electrode tab 112. As illustrated in FIG. 1, the other ends of both of the positive electrode lead 121 and the negative electrode lead 122 protrude to the outside of the battery case 13. Accordingly, the electricity generated inside the electrode assembly 10 may be supplied to the outside. Also, since the positive electrode tab 111 and the negative electrode tab 112 are formed to respectively protrude in various directions, the positive electrode lead 121 and the negative electrode lead 122 may also respectively extend in various directions.

Materials of the positive electrode lead 121 and the negative electrode lead 122 may be different from each other. That is, the positive electrode lead 121 may be formed of an aluminum (Al) material that is the same as the positive electrode collector, and the negative electrode lead 122 may be formed of a copper (Cu) material or nickel (Ni)-coated copper material that is the same as the negative electrode collector. Since a portion of the electrode lead 12 protruding to the outside of the battery case 13 becomes a terminal portion, it is electrically connected to an external terminal.

The battery case 13 is formed by forming a pouch film laminate which is formed of a flexible material. Hereinafter, the battery case 13 will be described as a pouch. The battery case 13 accommodates the electrode assembly 10 so that the portion of the electrode lead 12, that is, the terminal portion is exposed and is sealed. As illustrated in FIG. 1, the battery case 13 includes the first case 131 and the second case 132. A cup portion 133 is formed in the second case 132 to provide an accommodation space 1331 capable of accommodating the electrode assembly 10, and the first case 131 covers the accommodation space 1331 from the top so that the electrode assembly 10 is not separated to the outside of the battery case 13. In this case, as illustrated in FIG. 1, the cup portion 133 provided with the accommodation space 1331 may also be formed in the first case 131 to accommodate the electrode assembly 10 from the top. The first case 131 and the second case 132 may be prepared by connecting one sides thereof to each other as illustrated in FIG. 1, but the present invention is not limited thereto and the first case 131 and the second case 132 may be prepared in various ways, for example, the first case 131 and the second case 132 are separated from each other and prepared separately.

When the electrode lead 12 is connected to the electrode tab 11 of the electrode assembly 10 and the insulating portion 14 is formed on the portion of the electrode lead 12, the electrode assembly 10 is accommodated in the accommodation space 1331 provided in the cup portion 133 of the second case 132, and the first case 131 covers the space from the top. Then, an electrolyte solution is injected therein and the sealing portion 134 formed on edges of the first case 131 and the second case 132 is sealed. The electrolyte solution is to move lithium ions which are generated by an electrochemical reaction of the electrode during charge and discharge of the secondary battery 1, wherein it may include a non-aqueous organic electrolyte solution, which is a mixture of a lithium salt and high purity organic solvents, or a polymer using a polymer electrolyte. Through the above method, the pouch type secondary battery 1 may be prepared.

FIG. 2 is a cross-sectional view of the pouch film laminate 135 according to an embodiment of the present invention.

The battery case 13 of the pouch type secondary battery 1 according to the embodiment of the present invention is prepared by drawing the pouch film laminate 135. That is, the battery case is prepared by stretching the pouch film laminate 135 with a punch or the like to form the cup portion 133. According to an embodiment of the present invention, the pouch film laminate 135, as illustrated in FIG. 2, includes the sealant layer 1351, the gas barrier layer 1352, and the surface protection layer 1353, and, if necessary, may further include a drawing assistance layer 1354.

The sealant layer 1351 is formed of a first polymer, and is formed as an innermost layer to be directly in contact with the electrode assembly 10. Herein, the innermost layer refers to a layer positioned at the end of the gas barrier layer 1352 in a direction in which the electrode assembly 10 is positioned. When the pouch film laminate 135 having the above-described laminate structure is drawn using a punch or the like, a portion is stretched to form the cup portion 133 including the pocket-shaped accommodation space 1331. Then, the electrolyte solution is injected when the electrode assembly 10 is accommodated in the accommodation space 1331. Thereafter, if the upper pouch 131 and the lower pouch 132 are in contact with each other and the sealing portion 134 is thermally compressed, the sealant layers 1351 are adhered to each other to seal the pouch. In this case, the sealant layer 1351 must have insulation properties because it is directly in contact with the electrode assembly 10, and must have corrosion resistance because it is also in contact with the electrolyte solution. Also, since it is necessary to completely seal the inside to block material movement between the inside and the outside, it must have high sealing properties. That is, the sealing portion 134, in which sealant layers 1351 are adhered to each other, must have excellent thermal adhesive strength. In general, the first polymer for preparing the sealant layer 1351 may be formed of at least one material selected from the group consisting of polyethylene, polypropylene, polycarbonate, polyethylene terephthalate, polyvinyl chloride, acrylic polymer, polyacrylonitrile, polyimide, polyamide, cellulose, aramid, Nylon, polyester, polyparaphenylene benzobisoxazole, polyarylate, Teflon, and glass fibers. Particularly, a polyolefin-based resin, such as polypropylene (PP) or polyethylene (PE), is mainly used. Since polypropylene (PP) has excellent mechanical properties, such as tensile strength, stiffness, surface hardness, wear resistance, and heat resistance, and chemical properties such as corrosion resistance, it is mainly used for preparing the sealant layer 1351. Furthermore, the sealant layer may also be composed of casted polypropylene, acid modified polypropylene, or a polypropylene-butylene-ethylene terpolymer. Herein, the acid modified polypropylene may be MAH PP (maleic anhydride polypropylene). Also, the sealant layer 1351 may have a single-layer structure formed of any one material or may have a composite layer structure which is formed by layering two or more materials, respectively.

A thickness of the sealant layer 1351 may be 0.6 times to 1.2 times, preferably 0.7 times to 1.1 times, and more preferably 0.8 times to 1.1 times a thickness of the gas barrier layer to be described later. In a case in which the thickness of the sealant layer is less than 0.6 times the thickness of the gas barrier layer, sealing durability may be reduced, and, in a case in which the thickness of the sealant layer is greater than 1.2 times, since a total thickness of the pouch may be excessively increased, formability may be reduced. Also, in order to ensure sufficient insulation properties, it is more desirable that the thickness of the sealant layer 1351 is 0.8 times or more the thickness of the gas barrier layer.

Specifically, the thickness of the sealant layer 1351 may be in a range of 30 μm to 90 μm, preferably 50 μm to 90 μm, and more preferably 70 μm to 90 μm. In a case in which the thickness of the sealant layer 1351 is less than 30 μm, the sealing durability may be reduced, for example, internal destruction occurs during sealing, and, in a case in which the thickness of the sealant layer is greater than 90 μm, since the thickness of the pouch may be excessively increased, the formability may be reduced and battery energy density (energy per volume) may be reduced. Also, in order to ensure sufficient insulation properties, it is more desirable that the thickness of the sealant layer 1351 is 70 μm or more. The reason for this is that, when the thickness of the sealant layer is small, a dielectric breakdown voltage of the pouch film laminate may be decreased to deteriorate the insulation properties, and, in a case in which a battery is prepared by using the pouch film laminate with poor insulation properties, a failure rate may be increased.

The gas barrier layer 1352 is laminated between the surface protection layer 1353 and the sealant layer 1351 to secure mechanical strength of the pouch, block incoming and outgoing of gas or moisture from the outside of the secondary battery 1, and prevent leakage of the electrolyte solution.

The gas barrier layer 1352 is formed of an aluminum alloy film, and the gas barrier layer 1352 according to an embodiment of the present invention may particularly be formed of an aluminum alloy film having a thickness of 60 μm to 100 μm and a grain size of 10 μm to 13 μm. The aluminum alloy film is light-weighted while securing more than a predetermined level of mechanical strength, may compensate for electrochemical properties by the electrode assembly 10 and the electrolyte solution, and may secure a heat dissipation property.

Specifically, the aluminum alloy film according to an embodiment of the present invention may have a thickness of 60 μm to 100 μm, for example, 70 μm to 90 μm, and a grain size of 10 μm to 13 μm, preferably 10.5 μm to 12.5 μm, and more preferably 11 μm to 12 μm. When the thickness and grain size of the aluminum alloy film satisfy the above ranges, a forming depth may be increased without occurrence of pinholes or cracks during cup forming.

Conventionally, it is common to form the gas barrier layer 1352 to a thickness of 30 μm to 50 μm. However, in a case in which the thickness of the gas barrier layer is 30 μm to 50 μm, there was a limitation in increasing the depth of the cup portion 133 or forming an outer wall of the cup portion 133 close to vertical even if the pouch film laminate 135 is drawn, and there was also a limitation in reducing a filleting radius of curvature of an edge of the cup portion 133. Also, since puncture strength was low, there was a problem in that the internal electrode assembly 10 was easily damaged when the battery case 13 received an impact from the outside.

In order to improve this problem in the present invention, the gas barrier layer 1352 was formed to a thickness of 60 μm to 100 μm, particularly 70 μm to 90 μm. In a case in which the thickness of the gas barrier layer satisfies the above range, since formability of the gas barrier layer 1352 is improved, the cup portion 133 may be formed deep when the pouch film laminate 135 is drawn, the outer wall of the cup portion 133 is close to vertical, and the radius of curvature of the edge of the cup portion 133 may also be reduced. Then, since a volume of the accommodation space 1331 is increased, more electrodes and separators may be stacked in the electrode assembly 10 accommodated therein and energy efficiency to volume may be increased. However, if the thickness of the gas barrier layer 1352 is greater than 100 μm, since the total thickness of the pouch may be excessively increased, the energy density to volume of the secondary battery 1 may be rather reduced.

Also, in the case that the thickness of the gas barrier layer satisfies the above range, since the puncture strength of the pouch film laminate 135 is improved, it may more effectively protect the internal electrode assembly 10 even if it is under great pressure from the outside or is damaged by being pierced by a sharp object. Herein, the expression "excellent puncture strength" means that strength when puncturing a hole in the pouch film laminate 135 is high.

However, in a case in which only the thickness of the aluminum alloy film is increased, the forming depth may be increased, but, since pinholes or cracks occur in the aluminum alloy film after forming, a problem in the sealing durability occurs. Thus, as a result of a significant amount of research, the present inventors have found that, in a case in which an aluminum alloy film having a grain size of 10 μm to 13 μm was used, the occurrence of pinholes or cracks may be suppressed even if the forming depth was increased, thereby leading to the completion of the present invention. According to the study of the present inventors, in a case in which the grain size of the aluminum alloy film was greater than 13 μm, the strength of the aluminum alloy film was reduced to increase the occurrence of cracks or pinholes during forming, and, in a case in which the grain size was less than 10 μm, since flexibility of the aluminum alloy film was reduced, there was a limitation in improving the formability.

The grain size varies depending on a composition of the aluminum alloy film and a processing method of the aluminum alloy film, and may be measured by observing a cross section in a thickness direction of the aluminum alloy film with a scanning electron microscope (SEM). Specifically, in the present invention, a cross-sectional SEM image in the thickness direction of the aluminum alloy film was obtained using a scanning electron microscope, maximum diameters of 30 random grains among grains observed in the SEM image were measured, and an average value thereof was then evaluated as the grain size.

In the aluminum alloy film according to the present invention, a metallic element other than aluminum, for example, at least one selected from the group consisting of iron (Fe), copper (Cu), chromium (Cr), manganese (Mn), nickel (Ni), magnesium (Mg), silicon (Si), and zinc (Zn) may be included.

An iron (Fe) content of the aluminum alloy film may be in a range of 1.2 wt % to 1.7 wt %, preferably 1.3 wt % to 1.7 wt %, and more preferably 1.3 wt % to 1.45 wt %. In a case in which the iron (Fe) content in the aluminum alloy film is less than 1.2 wt %, the strength of the aluminum alloy film may be reduced to cause cracks and pinholes during forming, and, in a case in which the iron content is greater than 1.7 wt %, since the flexibility of the aluminum alloy film is reduced, there is a limitation in improving the formability.

Also, a silicon (Si) content of the aluminum alloy film may be in a range of 0.2 wt % or less, preferably 0.05 wt % to 0.2 wt %, and more preferably 0.08 wt % to 0.19 wt %, for example, 0.1 wt % to 1.18 wt %. In a case in which the silicon content is greater than 0.2 wt %, the formability may be reduced.

Specifically, the aluminum alloy film according to the present invention may be an aluminum alloy with alloy number AA8021.

FIG. 3 is a graph illustrating iron and silicon contents of an aluminum alloy with alloy number AA8079, which has mainly been used in a conventional pouch for a battery, and the aluminum alloy with alloy number AA8021 used in the present invention.

As illustrated in FIG. 3, alloy number AA8079 contains 0.6 wt % to 1.2 wt % of iron and 0.05 wt % to 0.3 wt % of silicon. In general, mechanical strength is improved when a large amount of iron is contained in an aluminum alloy, and flexibility is improved when a small amount of iron is contained. With respect to the aluminum alloy of alloy number AA8079, relatively little iron is contained, and, in a case in which the gas barrier layer 1352 is prepared by using the same, flexibility may be improved, but, since strength may be reduced, there may be a limitation in formability.

In contrast, as illustrated in FIG. 3, alloy number AA8021 contains 1.2 wt % to 1.7 wt %, particularly 1.3 wt % to 1.7 wt % of iron, and 0.05 to 1.9 wt %, particularly 0.08 wt % to 0.19 wt % of silicon. In a case in which the gas barrier layer 1352 is prepared from the aluminum alloy of alloy number AA8021, since iron is contained in a relatively large amount, tensile strength, elongation, and puncture strength may be improved.

Tensile strength (Rm), elongation (A), and grain size of the aluminum alloy with alloy number AA8079 and the aluminum alloy with alloy number AA8021 are illustrated in FIG. 4.

As illustrated in FIG. 4, AA8079 has low tensile strength and elongation so that there is a limitation in increasing the formability, and, since the grain size is relatively large at 13 μm to 21 μm, internal stress is less dispersed during stretching, and thus, there is a problem in that the number of pinholes is increased.

In contrast, since AA8021 has excellent formability due to its high tensile strength and elongation and has a relatively small grain size of 10 μm to 13 μm, the internal stress may be more dispersed during stretching, and thus, the occurrence of pinholes may be effectively suppressed.

When a tensile force is applied to a certain material, a relationship between tensile strength and elongation may be expressed as a graph. In this case, if a vertical axis of the graph is the tensile strength and a horizontal axis is the elongation, an area under the graph is toughness of the corresponding material. The toughness refers to a degree of toughness against destruction of the material, wherein the higher the toughness is, the more the material may be elongated until it does not break. In a case in which the gas barrier layer 1352 is prepared by using the aluminum alloy of alloy number AA8021, since the tensile strength and elongation are improved, the toughness may be increased and the formability may be improved.

The surface protection layer 1353 is formed of a second polymer, and is formed as an outermost layer to electrically insulate the electrode assembly 10 from the outside while protecting the secondary battery 1 from friction and collision with the outside. Herein, the outermost layer refers to a layer positioned at the end of the gas barrier layer 1352 in a direction opposite to the direction in which the electrode assembly 10 is positioned. The second polymer for preparing the surface protection layer 1353 may be at least one material selected from the group consisting of polyethylene, polypropylene, polycarbonate, polyethylene terephthalate, polyvinyl chloride, acrylic polymer, polyacrylonitrile, polyimide, polyamide, cellulose, aramid, Nylon, polyester, polyparaphenylene benzobisoxazole, polyarylate, Teflon, and glass fibers. Particularly, it is desirable that a polymer, such as polyethylene terephthalate (PET) having wear resistance and heat resistance, is mainly used. The surface protection layer 1353 may have a single-layer structure formed of any one material or may have a composite layer structure which is formed by layering two or more materials, respectively.

According to an embodiment of the present invention, a thickness of the surface protection layer 1353 may be in a range of 6 μm to 25 μm. If the thickness of the surface protection layer 1353 is less than 6 μm, there is a problem in that external insulation is reduced. In contrast, if the thickness of the surface protection layer 1353 is greater than 25 μm, since the total thickness of the pouch may be increased, the energy density to volume of the secondary battery 1 may be rather reduced.

PET is inexpensive, has excellent durability, and has excellent electrical insulation properties, but has weak adhesion to aluminum which is frequently used as the gas barrier layer 1352, and the PET and the aluminum have different behaviors from each other when they are stretched under stress. Thus, if the surface protection layer 1353 and the gas barrier layer 1352 are directly adhered, the surface protection layer 1353 and the gas barrier layer 1352 may be delaminated during drawing. As a result, since the gas barrier layer 1352 may not be stretched uniformly, the formability may be reduced.

According to an embodiment of the present invention, the battery case 13 may further include the drawing assistance layer 1354 which is formed of a third polymer and is laminated between the surface protection layer 1353 and the gas barrier layer 1352. The drawing assistance layer 1354 is laminated between the surface protection layer 1353 and the gas barrier layer 1352 to prevent the surface protection layer 1353 and the gas barrier layer 1352 from being delaminated during stretching. The third polymer for preparing the drawing assistance layer 1354 may be at least one material selected from the group consisting of polyethylene, polypropylene, polycarbonate, polyethylene terephthalate, polyvinyl chloride, acrylic polymer, polyacrylonitrile, polyimide, polyamide, cellulose, aramid, Nylon, polyester, polyparaphenylene benzobisoxazole, polyarylate, Teflon, and glass fibers. Particularly, since a Nylon resin is easy to adhere to the polyethylene terephthalate (PET) of the surface protection layer 1353 and has a similar behavior to the aluminum alloy of the gas barrier layer 1352 when stretched, it is desirable that the Nylon resin is mainly used as the third polymer. The drawing assistance layer 1354 may have a single-layer structure formed of any one material or may have a composite layer structure which is formed by layering two or more materials, respectively.

As described above, according to an embodiment of the present invention, since the gas barrier layer 1352 has a thickness of about 60 μm to about 100 μm, the formability of the gas barrier layer 1352 is improved. In this case, in order to also improve formability of the drawing assistance layer 1354, the drawing assistance layer 1354 may have a thickness of 20 μm to 50 μm, and, particularly, it is desirable that the drawing assistance layer 1354 has a thickness of 25 μm to 38 μm. If the thickness is less than 20 μm, since the drawing assistance layer 1354 may not match the improved formability of the gas barrier layer 1352, it may be broken during stretching. In contrast, if the thickness is greater than 50 μm, since the total thickness of the pouch may be increased, the volume of the secondary battery 1 may be increased and the energy density may be reduced.

The pouch film laminate according to the present invention may have a total thickness of 180 μm or more, for example, 180 μm to 210 μm. In a case in which the thickness of the pouch film laminate is 180 μm or more, the cup forming depth may be further increased than that of a conventional case. In a case in which the total thickness of the pouch film laminate is excessively large, it is not desirable because a total volume of the secondary battery is increased.

The pouch film laminate according to the present invention has excellent tensile strength and elongation by including the aluminum alloy film having specific thickness and grain size. Specifically, the pouch film laminate according to the present invention may have a tensile strength, which is measured while the pouch film laminate is pulled at a tensile speed of 50 mm/min after being cut to a size of 15 mm×80 mm, of 200 N/15 mm to 300 N/15 mm, preferably 210 N/15 mm to 270 N/15 mm, and more preferably 220 N/15 mm to 250 N/15 mm, and may have an elongation of 105% to 150%, preferably 105% to 140%, and more preferably 105% to 130%. As described above, since the pouch film laminate according to the present invention has high tensile strength and elongation and, as a result, the toughness is increased, the occurrence of cracks is less likely even when the forming depth is large during cup forming.

Also, the pouch film laminate according to the present invention has excellent puncture strength by including the aluminum alloy film having specific thickness and grain size. Specifically, the pouch film laminate according to the present invention may have a puncture strength of 30 N or more, for example, 30 N to 40 N.

Hereinafter, the present invention will be described in more detail, according to specific examples.

Example 1

A surface protection layer, a drawing assistance layer, and a gas barrier layer were formed by sequentially bonding a Nylon film having a width of 266 mm, a length of 50 m, and a thickness of 25 μm and a polyethylene terephthalate (PET) film having a width of 266 mm, a length of 50 m, and a thickness of 12 μm on one surface of an aluminum (Al) alloy thin film of alloy number AA8021 having a width of 266 mm, a length of 50 m, and a thickness of 80 μm by a dry lamination method using a urethane adhesive.

Next, casted polypropylene (CPP) was melted at a high temperature and then co-extruded on the other surface of the aluminum (Al) alloy thin film to form a sealant layer having a thickness of 60 μm to prepare a pouch film laminate. A total thickness of the pouch film laminate was 183 μm.

Example 2

A pouch film laminate was prepared in the same manner as in Example 1 except that a sealant layer was formed to a thickness of 80 μm. A total thickness of the pouch film laminate was 203 μm.

Comparative Example 1

A pouch film laminate was prepared in the same manner as in Example 1 except that an aluminum alloy film of alloy number AA8021 having a thickness of 40 μm was used as a gas barrier layer, a Nylon film having a thickness of 15 μm was used as a drawing assistance layer, and a sealant layer was formed to a thickness of 80 μm. A total thickness of the pouch film laminate was 153 μm.

Comparative Example 2

A pouch film laminate was prepared in the same manner as in Example 1 except that an aluminum alloy film of alloy number AA8021 having a thickness of 50 μm was used as a gas barrier layer. A total thickness of the pouch film laminate was 153 μm.

Comparative Example 3

A pouch film laminate was prepared in the same manner as in Example 1 except that an aluminum alloy film of alloy number AA8079 having a thickness of 80 μm was used as a gas barrier layer. A total thickness of the pouch film laminate was 183 μm.

Comparative Example 4

A pouch film laminate was prepared in the same manner as in Example 2 except that an aluminum alloy film of alloy number AA8079 having a thickness of 80 μm was used as a gas barrier layer. A total thickness of the pouch film laminate was 203 μm.

Comparative Example 5

A pouch film laminate was prepared in the same manner as in Example 1 except that an aluminum alloy film of alloy number AA8079 having a thickness of 40 μm was used as a gas barrier layer, a Nylon film having a thickness of 15 μm was used as a drawing assistance layer, and a sealant layer was formed to a thickness of 80 μm. A total thickness of the pouch film laminate was 153 μm.

Experimental Example 1: Grain Size Measurement

Cross sections in a thickness direction of the AA8021 and AA8079 aluminum alloy films respectively used as gas barrier layers in Example 1 and Comparative Example 3 were observed with a scanning electron microscope (SEM) to measure grain sizes. Specifically, after measuring maximum diameters of 30 grains observed in cross-sectional SEM images in the thickness direction of the aluminum alloy films which were obtained using a scanning electron microscope, the grain size was measured by a method of calculating an average value thereof.

The SEM image of the AA8021 aluminum alloy film and the SEM image of the AA8079 aluminum alloy film are illustrated in FIG. 5. As a result of measuring grain sizes based on the illustrated SEM images, the grain size of AA8021 was 11.6 μm and the grain size of AA8079 was 16.8 μm.

Experimental Example 2: Formability Evaluation

After cutting each of the pouch film laminates prepared in Examples 1 and 2 and Comparative Examples 1 to 5 to the same size of 90 mm×150 mm, forming was performed while changing a forming depth in a battery case forming device having a forming part with a size of 32 mm in width×55 mm in length. The forming depth at which cracks occurred in each sample was recorded. Herein, corners and edges of a punch and the forming part of the battery case forming device were filleted, the corner of the punch had a curvature of 2 mm, the edge thereof had a curvature of 1 mm, the corner of the forming part had a curvature of 2.3 mm, and the edge thereof had a curvature of 1 mm. In addition, clearance of the punch and the forming part was 0.3 mm. Measurement results are presented in Table 2 below.

TABLE 1

| | Surface protection layer | | Drawing assistance layer | | Gas barrier layer | | Sealant layer | | Total |
| --- | --- | --- | --- | --- | --- | --- | --- | --- | --- |
| | Material | Thickness (μm) | Material | Thickness (μm) | Alloy number | Thickness (μm) | Material | Thickness (μm) | thickness (μm) |
| Example 1 | PET | 12 | Nylon | 25 | AA8021 | 80 | CPP | 60 | 183 |
| Example 2 | PET | 12 | Nylon | 25 | AA8021 | 80 | CPP | 80 | 203 |
| Comparative Example 1 | PET | 12 | Nylon | 15 | AA8021 | 40 | CPP | 80 | 153 |
| Comparative Example 2 | PET | 12 | Nylon | 25 | AA8021 | 50 | CPP | 60 | 153 |
| Comparative Example 3 | PET | 12 | Nylon | 25 | AA8079 | 80 | CPP | 60 | 183 |
| Comparative Example 4 | PET | 12 | Nylon | 25 | AA8079 | 80 | CPP | 80 | 203 |
| Comparative Example 5 | PET | 12 | Nylon | 15 | AA8079 | 40 | CPP | 80 | 153 |

TABLE 2

|  | Example 1 | Example 2 | Comparative Example 1 | Comparative Example 2 | Comparative Example 3 | Comparative Example 4 | Comparative Example 5 |
|---|---|---|---|---|---|---|---|
| Total thickness (μm) | 183 | 203 | 153 | 153 | 183 | 203 | 153 |
| Forming depth (mm) | 15 | 15.5 | 9 | 12 | 13 | 14 | 8.5 |

As listed in Table 2, with respect to the pouch film laminates according to Examples 1 and 2 of the present invention, cracks did not occur and they may be formed to a depth of 15.0 mm or more, but, with respect to the pouch film laminates of Comparative Examples 1 to 5 in which gas barrier layer thicknesses and/or grain sizes were outside the ranges of the present invention, cracks occurred at a forming depth of less than 15.0 mm. Thus, it may be confirmed that the formability of the pouch film laminate was improved when the gas barrier layer thickness and grain size of the present invention were satisfied. If a battery case is prepared by using the pouch film laminate according to the preparation example of the present invention, since one cup portion is formed in each of a second case and a first case, an accommodation space having a depth of 30 mm or more may be obtained. Therefore, since a thicker electrode assembly may be accommodated, the energy efficiency to volume of the secondary battery may be increased.

Experimental Example 3: Evaluation of Tensile Strength and Elongation

After cutting 5 samples of each of the pouch film laminates prepared in Examples 1 and 2 and Comparative Examples 1 to 5 to the same size of 15 mm×80 mm, each of the samples was fixed to a lower jig of a tensile strength tester (manufacturer: Shimadzu, model: AGX-V). In addition, after fixing each sample with an upper jig to a point of 30 mm from a top end, the samples were elongated by moving the upper jig away from the lower jig at a speed of 50 mm/min. Then, tensile strength and elongation just before the pouch film laminate was fractured were measured. Measurement results are presented in Tables 3 and 4 below.

TABLE 3

|  | Example 1 | | Example 2 | | Comparative Example 1 | | Comparative Example 2 | |
|---|---|---|---|---|---|---|---|---|
|  | Tensile strength (N/15 mm) | Elongation (%) | Tensile strength (N/15 mm) | Elongation (%) | Tensile strength (N/15 mm) | Elongation (%) | Tensile strength (N/15 mm) | Elongation (%) |
| 1 | 234 | 112 | 249 | 117 | 158 | 101 | 198 | 96 |
| 2 | 238 | 104 | 246 | 114 | 164 | 127 | 200 | 95 |
| 3 | 234 | 102 | 244 | 124 | 163 | 113 | 201 | 108 |
| 4 | 241 | 119 | 249 | ill | 162 | 108 | 203 | 110 |
| 5 | 228 | 98 | 251 | 11 | 163 | 120 | 201 | 107 |
| Average | 235.0 | 107.0 | 247.9 | 115.0 | 162.0 | 113.8 | 200.6 | 103.2 |

17

TABLE 4

| | Comparative Example 3 | | Comparative Example 4 | | Comparative Example 5 | |
|---|---|---|---|---|---|---|
| | Tensile strength (N/15 mm) | Elonga-tion (%) | Tensile strength (N/15 mm) | Elonga-tion (%) | Tensile strength (N/15 mm) | Elonga-tion (%) |
| 1 | 222 | 102 | 234 | 113 | 159 | 109 |
| 2 | 221 | 107 | 227 | 118 | 151 | 105 |
| 3 | 221 | 103 | 231 | 107 | 158 | 110 |
| 4 | 216 | 110 | 237 | 108 | 152 | 124 |
| 5 | 219 | 102 | 232 | 110 | 146 | 109 |
| Average | 219.8 | 104.7 | 231.9 | 111.2 | 153.2 | 111.4 |

FIG. 6 is a graph of the results of testing tensile strength and elongation of the pouch film laminates according to Example 1, Comparative Example 1, and Comparative Example 2 of the present invention. Referring to FIG. 6 and Tables 3 and 4, it may be confirmed that the pouch film laminates of Examples 1 and 2 had better tensile strength and elongation than the pouch film laminates of Comparative Examples 1 to 5.

In a graph between tensile strength and elongation, an area under the graph is toughness of the corresponding material, wherein, as illustrated in FIG. 6, it may be understood that a graph area of the pouch film laminate according to Example 1 of the present invention was larger than graph areas of the pouch film laminates according to Comparative Example 1 and Comparative Example 2, and this showed that the pouch film laminate of Example 1 according to the present invention had excellent toughness.

Experimental Example 4: Puncture Strength Evaluation

After cutting 10 samples of each of the pouch film laminates prepared in Examples 1 and 2 and Comparative Examples 1 to 5 to the same size of 90 mm×80 mm, each sample was horizontally fixed to a jig of a puncture strength tester (manufacturer: Shimadzu, model: AGX-V). A pin having a diameter of 1.0 mm and a tip curvature of 0.5 mm was installed vertically above the installed sample. Then, puncture strengths of the samples were measured by dropping the pin to the samples, respectively. Measurement results are presented in Table 5 below.

TABLE 5

| Puncture strength (N) | Example 1 | Example 2 | Comparative Example 1 | Comparative Example 2 | Comparative Example 3 | Comparative Example 4 | Comparative Example 5 |
|---|---|---|---|---|---|---|---|
| 1 | 37.0 | 37.1 | 24.5 | 34.5 | 35.9 | 36.5 | 24.6 |
| 2 | 37.1 | 38.1 | 25.0 | 34.6 | 35.6 | 36.4 | 24.3 |
| 3 | 36.6 | 37.8 | 24.4 | 34.0 | 35.7 | 37.0 | 24.8 |
| 4 | 36.5 | 37.4 | 24.8 | 34.5 | 35.7 | 37.3 | 24.7 |
| 5 | 36.4 | 37.3 | 24.0 | 34.1 | 35.4 | 36.9 | 24.4 |
| 6 | 37.0 | 38.0 | 24.6 | 34.7 | 36.3 | 37.5 | 24.6 |
| 7 | 37.1 | 37.1 | 24.3 | 34.7 | 35.6 | 36.7 | 24.8 |
| 8 | 36.9 | 37.6 | 25.2 | 34.6 | 35.9 | 36.3 | 24.0 |
| 9 | 36.7 | 37.3 | 24.4 | 34.3 | 36.2 | 36.5 | 24.4 |
| 10 | 37.2 | 37.1 | 25.2 | 34.4 | 35.4 | 36.9 | 24.5 |
| Average | 36.9 | 37.5 | 24.6 | 34.4 | 35.8 | 36.8 | 24.5 |

FIG. 7 is a graph of the results of testing puncture strength of the pouch film laminates according to Example 1, Comparative Example 1, and Comparative Example 2 of the present invention. Referring to FIG. 7 and Table 5, it may be confirmed that the pouch film laminates of Examples 1 and 2 had better puncture strength than the pouch film laminates of Comparative Examples 1 to 5. That is, the pouch film laminate according to the present invention may more effectively protect an internal electrode assembly even if it is under great pressure from the outside or is damaged by being pierced by a sharp object.

Experimental Example 5: Insulation Property Evaluation

After each of the pouch film laminates prepared in Examples 1 and 2 was cut to the same size of 90 mm×150 mm and then stored in a vacuum oven at 60 degrees for 24 hours, a dielectric breakdown voltage was measured in a dry room. Specifically, an aluminum thin film having a thickness of 5 t was disposed on both sides of the pouch film laminate, a (+) electrode of a measuring device was connected to the gas barrier layer of the pouch film laminate, and, after connecting a (−) electrode to the aluminum thin film in contact with the sealant layer, an applied voltage, when a leakage current measured while applying a voltage at a rate of 100 V/s was 0.5 Ma or more, was evaluated as the dielectric breakdown voltage. Measurement results are presented in Table 6 below.

TABLE 6

| Number of times | Example 1 | Example 2 |
|---|---|---|
| 1 | 3868 V | 4573 V |
| 2 | 3844 V | 4562 V |
| 3 | 3853 V | 4533 V |
| Average | 3855 V | 4556 V |

Referring to Table 6, it may be confirmed that a dielectric breakdown voltage of the pouch film laminate of Example 2 having a sealant layer thickness of 80 μm was higher than that of the pouch film laminate of Example 1 having a sealant layer thickness of 60 μm, wherein this showed that insulation properties were better when the thickness of the sealant layer was 80 μm.

It will be understood by those of ordinary skill in the art that various changes in form and details may be made therein without departing from the spirit and scope of the invention as defined by the following claims. Accordingly, it is to be understood that the invention has been described by way of illustration and not limitation. Thus, the scope of the invention is defined by the following claims rather than the foregoing detailed description, and it is to be interpreted that all changes or modifications derived from the meaning, scope and equivalent concept of the appended claims are within the scope of the present invention.

| <Description of the Symbols> | |
|---|---|
| 1: Secondary Battery | 10: Electrode Assembly |
| 11: Electrode Tab | 12: Electrode Lead |
| 13: Battery Case | 14: Insulation Portion |
| 111: Positive Electrode Tab | 112: Negative Electrode Tab |
| 121: Positive Electrode Lead | 122: Negative Electrode Lead |
| 131: First Case | 132: Second Case |
| 133: Cup Portion | 134: Sealing Portion |
| 135: Pouch Film Laminate | 1331: Accommodation Space |
| 1351: Sealant Layer | 1352: Gas Barrier Layer |
| 1353: Surface Protection Layer | 1354: Drawing Assistance Layer |

The invention claimed is:

1. A pouch type battery case accommodating an electrode assembly therein which is formed by stacking a positive electrode, a separator, and a negative electrode, the pouch type battery case comprising a pouch film laminate including:

a sealant layer formed of a first polymer that is an innermost layer;

a surface protection layer formed of a second polymer that is an outermost layer; and a gas barrier layer laminated between the surface protection layer and the sealant layer and formed of an aluminum alloy film having a thickness of 60 μm to 100 μm and a grain size of 10.5 μm to 12.5 μm, the grain size being an average of maximum diameters of 30 random grains in a thickness direction cross section of the aluminum alloy film, wherein the sealant layer has a thickness of 50 μm to 90 μm, and the pouch film laminate has a total thickness of 180 μm or more.

2. The pouch type battery case of claim 1, wherein the aluminum alloy film comprises iron in an amount of 1.2 wt % to 1.7 wt %.

3. The pouch type battery case of claim 1, wherein the aluminum alloy film comprises iron in an amount of 1.3 wt % to 1.7 wt %.

4. The pouch type battery case of claim 1, wherein the aluminum alloy film comprises silicon in an amount of 0.2 wt % or less.

5. The pouch type battery case of claim 1, wherein the aluminum alloy film has alloy number AA8021.

6. The pouch type battery case of claim 1, wherein the gas barrier layer has a thickness of 70 μm to 90 μm.

7. The pouch type battery case of claim 1, wherein a thickness of the sealant layer is 0.6 times to 1.2 times a thickness of the gas barrier layer.

8. The pouch type battery case of claim 1, wherein the first polymer comprises polypropylene (PP).

9. The pouch type battery case of claim 1, wherein the surface protection layer has a thickness of 6 μm to 25 μm.

10. The pouch type battery case of claim 1, wherein the second polymer comprises polyethylene terephthalate (PET).

11. The pouch type battery case of claim 1, further comprising a drawing assistance layer formed of a third polymer and laminated between the surface protection layer and the gas barrier layer.

12. The pouch type battery case of claim 11, wherein the drawing assistance layer has a thickness of 20 μm to 50 μm.

13. The pouch type battery case of claim 11, wherein the third polymer comprises Nylon.

14. The pouch type battery case of claim 1, wherein the pouch film laminate has a tensile strength, measured while the pouch film laminate is pulled at a tensile speed of 50 mm/min after being cut to a size of 15 mm×80 mm, of 200 N/15 mm to 300 N/15 mm, and has an elongation of 105% to 150%.

15. The pouch type battery case of claim 1, wherein the pouch film laminate has a puncture strength of 30 N or more.

16. A pouch type secondary battery comprising an electrode assembly therein which is formed by stacking a positive electrode, a separator, and a negative electrode; and a pouch type battery case accommodating the electrode assembly, the battery case comprising a pouch film laminate including:

a sealant layer formed of a first polymer that is an innermost layer;

a surface protection layer formed of a second polymer that is an outermost layer; and a gas barrier layer laminated between the surface protection layer and the sealant layer and formed of an aluminum alloy film having a thickness of 60 μm to 100 μm and a grain size of 10.5 μm to 12.5 μm, the grain size being an average of maximum diameters of 30 random grains in a thickness direction cross section of the aluminum alloy film, wherein the sealant layer has a thickness of 50 μm to 90 μm, and the pouch film laminate has a total thickness of 180 μm or more.

* * * * *